US011462778B2

(12) United States Patent
Agnello

(10) Patent No.: US 11,462,778 B2
(45) Date of Patent: Oct. 4, 2022

(54) BATTERY ELECTROLYTE LEVEL DEVICE

(71) Applicant: Consolidated Edison Company of New York, Inc., New York, NY (US)

(72) Inventor: Robert Agnello, Fresh Meadows, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 0 days.

(21) Appl. No.: 16/990,618

(22) Filed: Aug. 11, 2020

(65) Prior Publication Data
US 2021/0257682 A1 Aug. 19, 2021

Related U.S. Application Data

(60) Provisional application No. 62/977,961, filed on Feb. 18, 2020.

(51) Int. Cl.
H01M 10/48 (2006.01)
H01M 10/06 (2006.01)
G01F 23/04 (2006.01)
H01M 50/60 (2021.01)
H01M 50/636 (2021.01)

(52) U.S. Cl.
CPC ......... *H01M 10/484* (2013.01); *G01F 23/04* (2013.01); *H01M 10/06* (2013.01); *H01M 50/60* (2021.01); *H01M 50/636* (2021.01)

(58) Field of Classification Search
CPC .... H01M 10/484; H01M 10/06; H01M 50/60; H01M 50/636; G01F 23/04
See application file for complete search history.

(56) References Cited

U.S. PATENT DOCUMENTS

| 2,919,028 | A | * | 12/1959 | Janus | G01F 23/04 210/223 |
| 3,735,494 | A | | 5/1973 | Gumtow | |
| 4,184,011 | A | * | 1/1980 | Strazewski | G01F 23/58 73/309 |
| 5,550,474 | A | * | 8/1996 | Dahl | H01M 10/484 324/432 |
| 8,603,656 | B2 | * | 12/2013 | Streuer | H01M 10/48 429/89 |
| 2006/0000103 | A1 | | 1/2006 | Nicosia et al. | |
| 2016/0334260 | A1 | | 11/2016 | Reaume | |
| 2017/0162919 | A1 | * | 6/2017 | Doyle | H01M 50/383 |

FOREIGN PATENT DOCUMENTS

| CN | 204060855 U | * 12/2014 |
| EP | 1450140 A1 | 8/2004 |
| GB | 639310 A | 6/1950 |
| GB | 1201671 A | 8/1970 |

* cited by examiner

*Primary Examiner* — Matthew T Martin
*Assistant Examiner* — Justin C. King
(74) *Attorney, Agent, or Firm* — Cantor Colburn LLP

(57) ABSTRACT

An electrolyte level measuring device for a vented lead acid battery and a method of monitoring an electrolyte level is provided. The measuring device includes an elongated body. A stop member extends outwardly from the elongated body, the stop member being sized larger than an opening in the vented lead acid battery. At least one projection extends orthogonally from the elongated body.

5 Claims, 6 Drawing Sheets

BATTERY ELECTROLYTE LEVEL DEVICE

CROSS REFERENCE TO RELATED APPLICATIONS

This application claims the benefit of U.S. Provisional Application Ser. No. 62/977,961, filed Feb. 18, 2020, the entire disclosure of which is incorporated herein by reference.

BACKGROUND

The subject matter disclosed herein relates to batteries that contain an electrolyte that is periodically checked, and in particular to a device for checking the level of electrolyte.

Batteries, such as vented lead acid batteries for example, are used in a variety of applications, including but not limited to electrical power systems, generator systems, and locomotive systems for example. These batteries have a high reserve capacity that make them advantageous for providing starting power in applications. Each battery includes a number of cells that include electrolyte. The level of the electrolyte is checked on a periodic basis to ensure it is within a predetermined level. If the level falls below the predetermined level, the useful life of the battery and the battery capacity may be adversely effected.

When the batteries are used in some applications, such as in an electrical distribution system for example, the operation of the battery may be subject to a regulatory authority. In an electrical distribution application, the battery may be subject to regulation by the North American Reliability Corporation (NERC). If the batteries do not have sufficient capacity (such as due to a low electrolyte level) when brought into operation and are unable to support their intended load, the electrical utility responsible for the batteries may be subject to a monetary penalty. As a result, electrical utilities regularly inspect the batteries to ensure electrolyte levels.

Batteries used in electrical distribution systems (such as in conjunction with gas turbines), are often housed in cabinets. This arrangement often makes it difficult for maintenance personnel to check the electrolyte levels within the interior of the cabinet. Further, checking the level is performed visually by removing a cap and looking into the interior of the battery to confirm the level. It should be appreciated that this is a time consuming process.

Accordingly, while existing processes for checking electrolyte in vented lead acid batteries, the need for improvement remains, particularly in providing a reliable and rapid means for determining electrolyte level.

BRIEF DESCRIPTION

According to one aspect of the disclosure an electrolyte level measuring device for a vented lead acid battery is provided. The device includes an elongated body. A stop member extends outwardly from the elongated body, the stop member being sized larger than an opening in the vented lead acid battery. At least one projection extends orthogonally from the elongated body.

In addition to one or more of the features described herein, or as an alternative, further embodiments of the device may include the stop member being offset from a first end of the elongated body. In addition to one or more of the features described herein, or as an alternative, further embodiments of the device may include the at least one projection being positioned adjacent a second end of the elongated body, the second end being opposite the first end. In addition to one or more of the features described herein, or as an alternative, further embodiments of the device may include the at least one projection having a first projection and a second projection, the first projection being disposed at the second end, the second projection being positioned between the first projection and the stop member.

In addition to one or more of the features described herein, or as an alternative, further embodiments of the device may include the at least one projection having a first projection and a second projection disposed on opposite sides of the elongated body at the second end. In addition to one or more of the features described herein, or as an alternative, further embodiments of the device may include the at least one projection having a third projection and a fourth projection disposed on opposite sides of the elongated body, the third projection and fourth projection being positioned between the second end and the stop member. In addition to one or more of the features described herein, or as an alternative, further embodiments of the device may include the stop member having a cylindrical shape.

In addition to one or more of the features described herein, or as an alternative, further embodiments of the device may include the elongated body having a rectangular cross-section in a plane parallel with a surface of the stop member. In addition to one or more of the features described herein, or as an alternative, further embodiments of the device may include the at least one projection being disposed a predetermined distance from a bottom surface of the stop member.

According to another aspect of the disclosure a method of servicing electrolyte in a vented lead acid battery is provided. The method includes removing a cap on a cell of the vented lead acid battery to expose an opening. A level measurement device is inserted into the opening, the device having an elongated body with a stop member extending from the body and at least one projection extending from orthogonally from the body. The stop member contacts with a surface of the vented lead acid battery. The device is removed from the opening. A location of an electrolyte fluid on the elongated body is compared relative to the at least one projection.

In addition to one or more of the features described herein, or as an alternative, further embodiments of the method may include adding additional electrolyte when the electrolyte fluid is located at a predetermined position relative to the at least one projection. In addition to one or more of the features described herein, or as an alternative, further embodiments of the method may include the at least one projection having a first projection and a second projection, the first projection being disposed at an end opposite the stop member, the second projection being positioned between the first projection and the stop member.

In addition to one or more of the features described herein, or as an alternative, further embodiments of the method may include adding of the additional electrolyte being performed when the electrolyte fluid is located between the first projection and the second projection. In addition to one or more of the features described herein, or as an alternative, further embodiments of the method may include replacing the cap after adding the additional electrolyte.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Embodiments of the present disclosure provide for an electrolyte measurement device for use with batteries, such as vented lead acid batteries. Embodiments of the present disclosure provide advantages in allowing service personnel to quickly determine an electrolyte level within a battery even when the battery is positioned within a cabinet.

Figure 1:
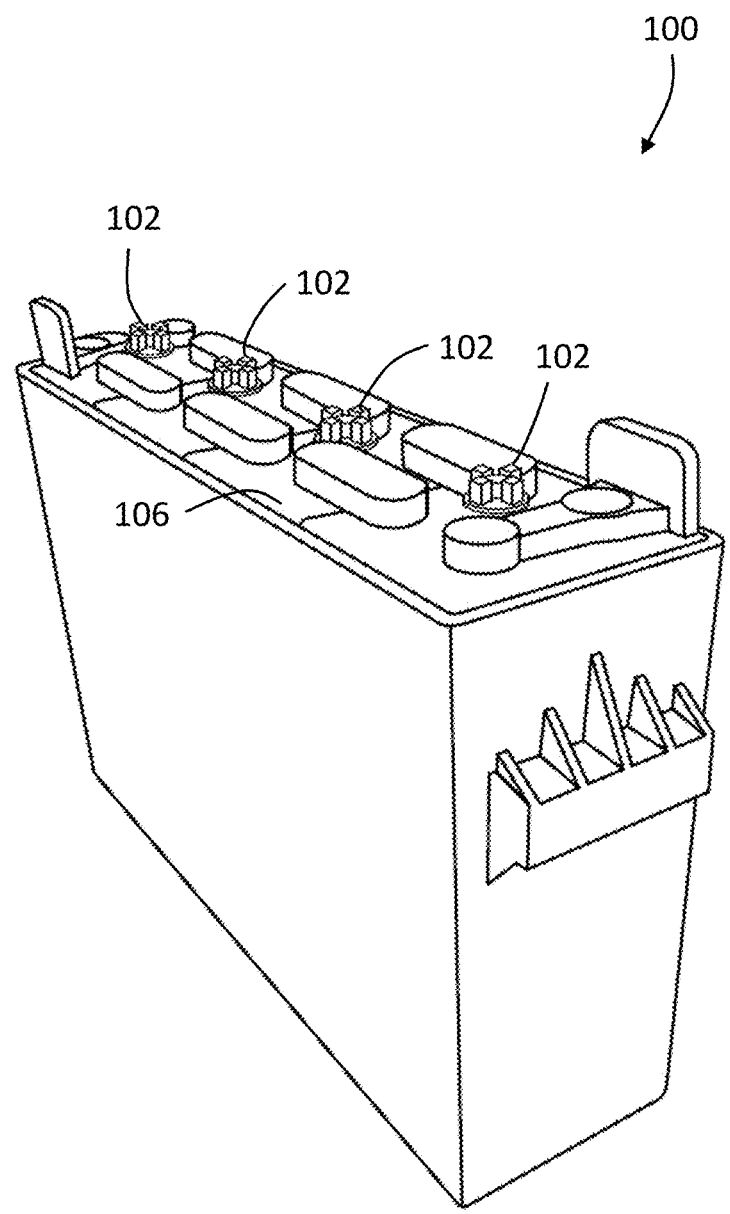
FIG. 1 is perspective view of a prior art vented lead acid battery in accordance with an embodiment.

Referring to FIG. 1, an embodiment is shown of a prior art battery 100, such as a vented lead acid battery for example. Batteries of this type are typically constructed of a plurality of cells that are filled with an electrolyte fluid. The electrolyte acts as a catalyst to allow movement of ions between the anode and cathode. In a lead acid type battery, the electrolyte may include a sulfuric acid and water mixture. During use, the water evaporates causing the electrolyte level to drop.

As a result, the battery 100 needs to be periodically inspected to ensure the electrolyte level is within a predetermined range so that it can provide the desired performance. To access the interior of the battery 100, the battery 100 includes a plurality of caps 102. Each of the caps 102 is associated with one of the cells within the battery 100. In the illustrated embodiment, the battery 100 includes four cells and there are four caps 102 that provide access to those cells respectively.

It should be appreciated that the battery 100 may be paired a plurality of batteries 100, connected in series or in parallel, to provide the desired electrical characteristics for the desired application (e.g. starting a gas turbine engine). It should further be appreciated that while visually checking the electrolyte level of a single battery in an open area is relatively simple, the device provides a safe, re-usable and reliable electrolyte indication when a plurality of batteries are packaged closely together in a cabinet where the individual batteries may not be easily removed, the visual checking of the electrolyte becomes more difficult.

Figure 2:
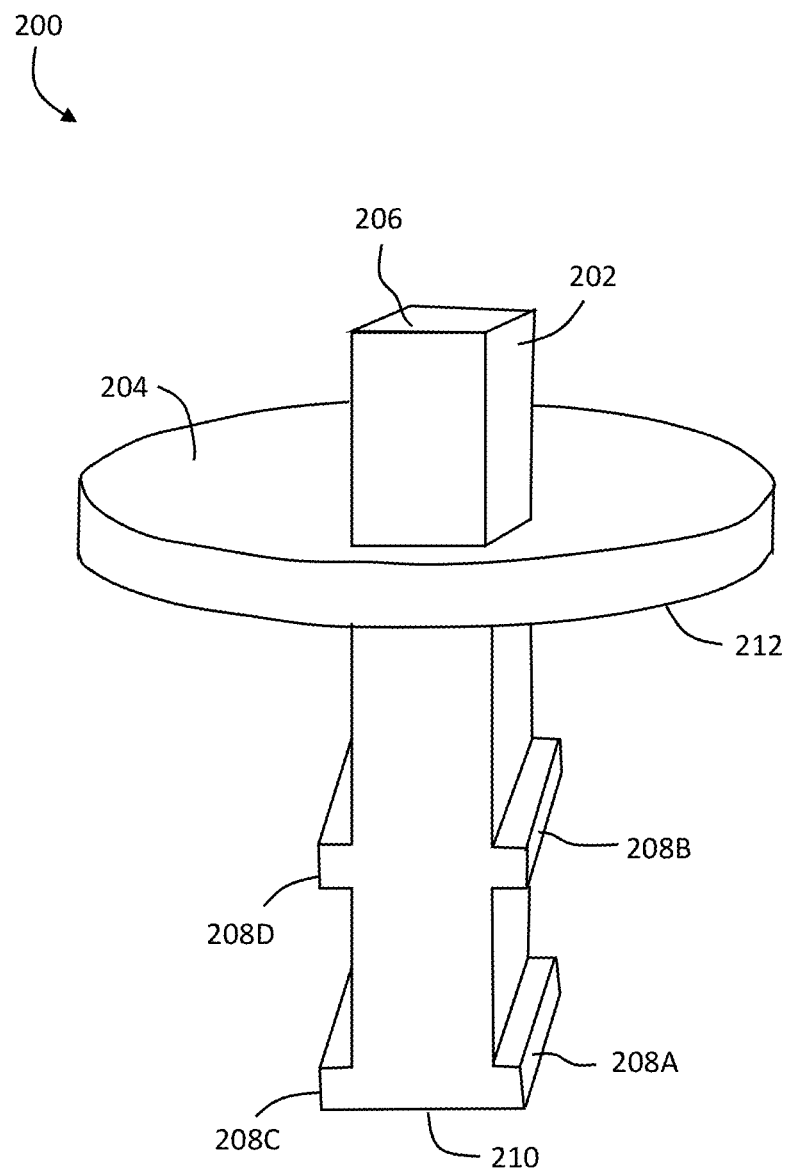
FIG. 2 is a perspective view of an electrolyte level measuring device for use with the battery of FIG. 1 in accordance with an embodiment.
Figure 3:
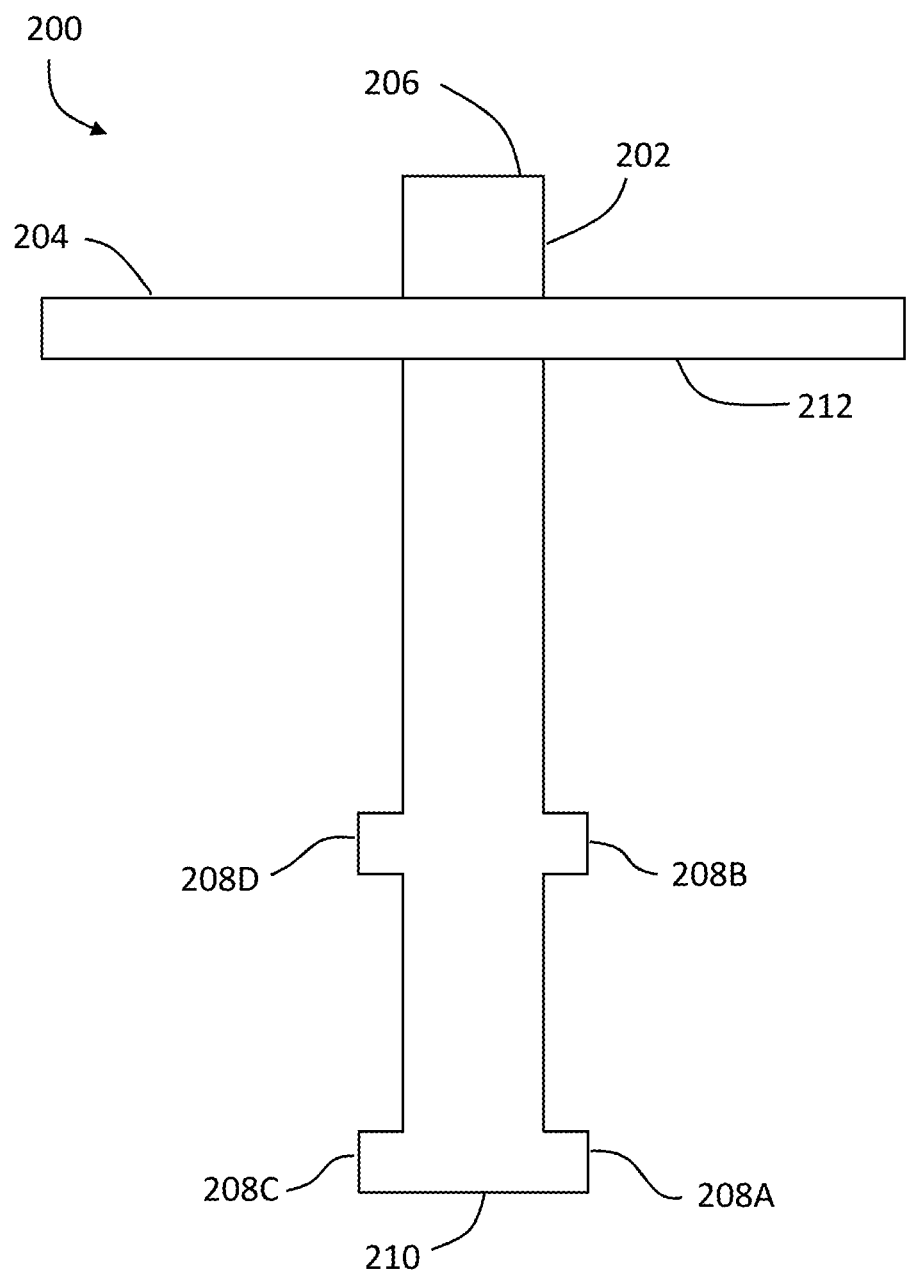
FIG. 3 is an end view of the electrolyte level measuring device of FIG. 2.
Figure 4:
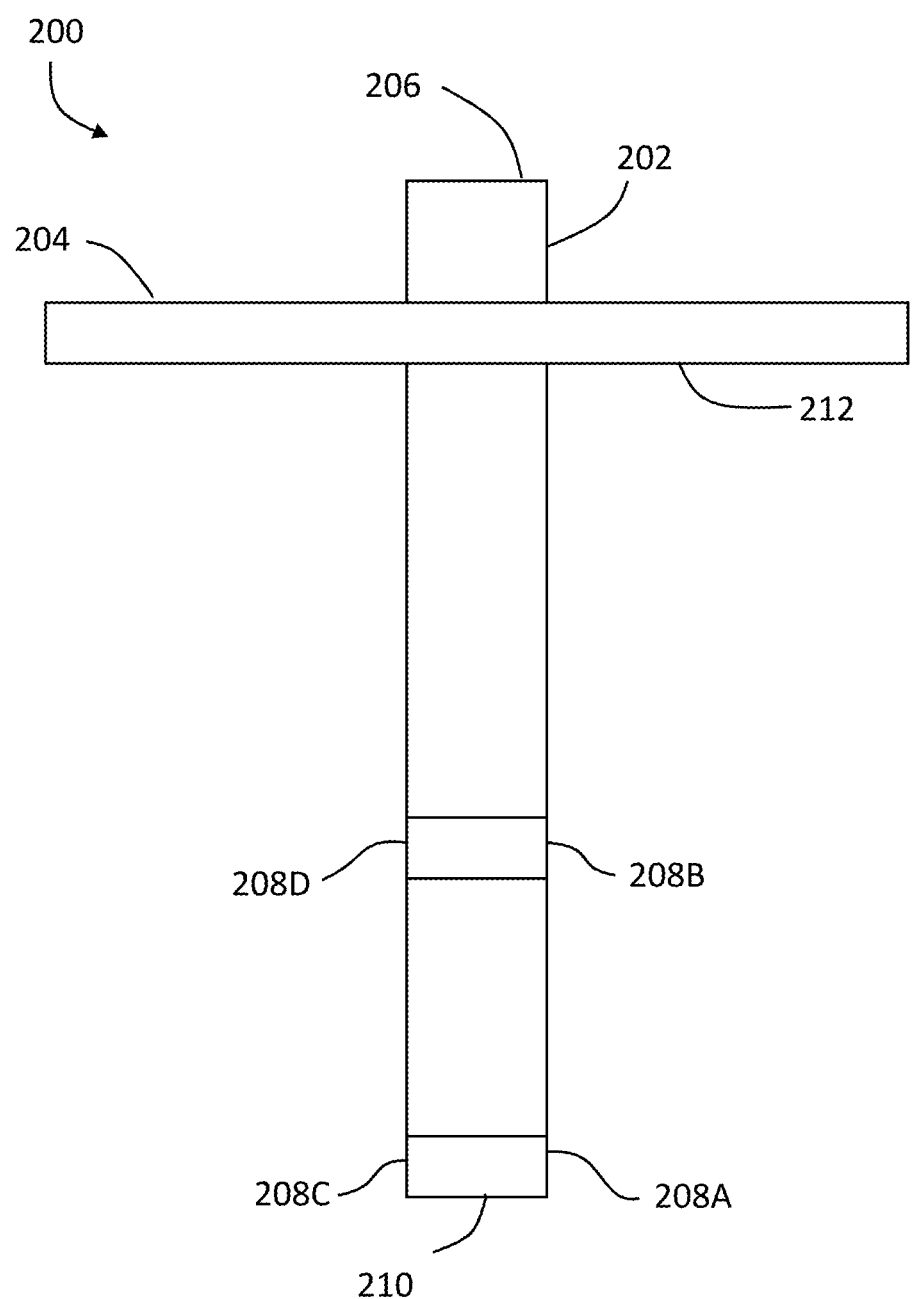
FIG. 4 is a side view of the electrolyte level measuring device of FIG. 2.

Referring now to FIGS. 2-4, an embodiment shown of an electrolyte measurement device 200. The device 200 includes an elongated body 202 having a square cross section. It should be appreciated that while the illustrated embodiment shows the body 202 as being square, this is for exemplary reasons and the claims should not be so limited. In other embodiments, the elongated body 202 may have a rectangular, circular, oval or any other suitable shape. The body 202 may be made from any suitable material, such as metal, plastic, or a composite material for example. In the illustrated embodiment, the body 202 is made from a high density polyethylene structural foam.

The device 200 further includes a stop member 204 that extends outward from the elongated body 202. In the illustrated embodiment, the stop member 204 is integrally formed with the elongated body 202. The stop member 204 may have a cylindrical shape having an outer diameter that is larger than the opening in the battery 100 that is enclosed by the cap 102. In other words, the stop member 204 is large enough to prevent the device 200 from falling into the battery opening. It should be appreciated that while the stop member 204 is illustrated as having a circular cross section (in a plane perpendicular to the axis of the elongated body), this is for example purposes and the stop member 204 may have other shapes. In other embodiments, the stop member 204 may have other shapes, such as but not limited to: square, rectangular, or oval shapes for example.

In the illustrated embodiment, the stop member 204 is offset a distance from a first end 206 of the elongated body 202. This provides an area for the operator to gasp the device 200 with their fingers to insert and remove the device 200 from the battery 100. In other embodiments, the stop member 204 may be positioned adjacent to, or located at, the end 206. In these embodiments, the stop member 204 may have an increased thickness to allow the operator to handle the device with their fingers.

The device 200 further includes at least one projection 208A. In the illustrated embodiment there are four projections 208A, 208B, 208C, 208D arranged in two pairs. In the illustrated embodiment, the projections are integrally formed with the elongated body 202. The projection 208A extends orthogonally or perpendicular to the elongated body 202. In an embodiment, the projection 208A has a square or rectangular cross section. The first projection 208A may be positioned adjacent to, or located at, a second end 210 of the elongated body 202.

In an embodiment, the device 200 includes a second projection 208B that is spaced apart from the first projection 208A. In an embodiment, the second projection 208B is positioned between the first projection 208A and a bottom surface 212 of the stop member 204. In yet another embodiment, the device 200 includes a third projection 208C that is positioned on an opposite side of the elongated body 202 from the first projection 208. In still another embodiment, the device 200 includes a fourth projection 208D that is positioned on an opposite side of the elongated body 202 from the second projection 208B.

The projections 208A, 208B, 208C, 208D are positioned at predetermined distances from the bottom surface 212 to provide indication to the operator whether the electrolyte level is at a desired level. In the illustrated embodiment, when the device 200 is placed in the battery 100, a small amount of electrolyte will stick to the surface of the elongated body 202 and collect on the projections that are submerged in the electrolyte. In an embodiment, when the electrolyte level is between the first pair of projections 208A, 208C and the second pair of projections 208B, 208D, the electrolyte level is within the desired operating range. In an embodiment, when the electrolyte level is below the first pair of projections 208A, 208C, then this indicates to the operator that additional water should be added to the battery.

Figure 5:
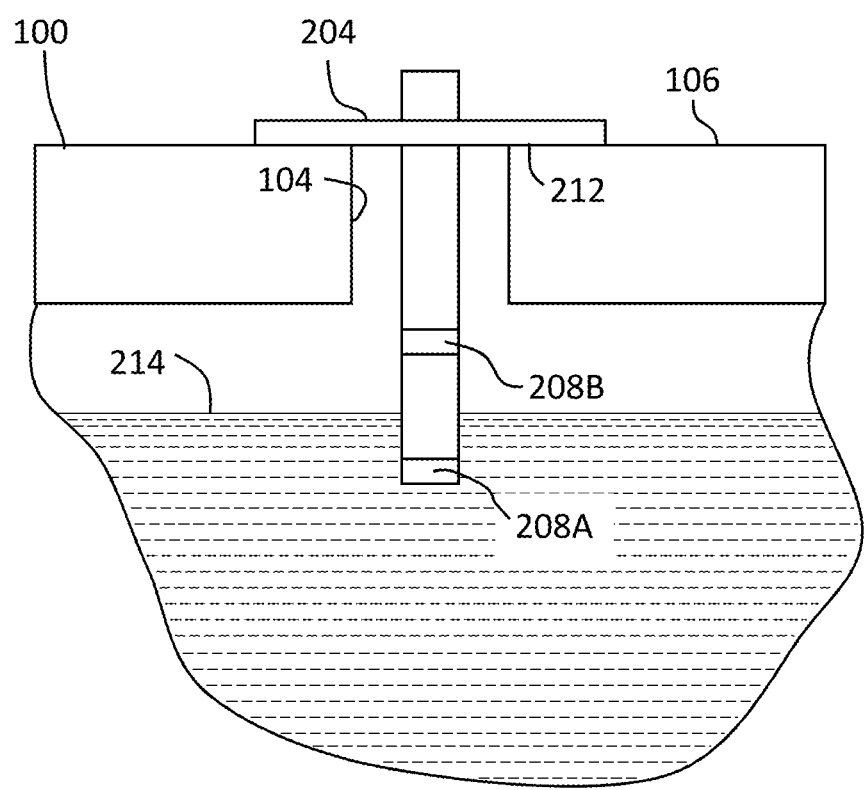
FIG. 5 is a side view partially in section of the device of FIG. 2 inserted into a vented lead acid battery where the electrolyte is within a predetermined range.
Figure 6:
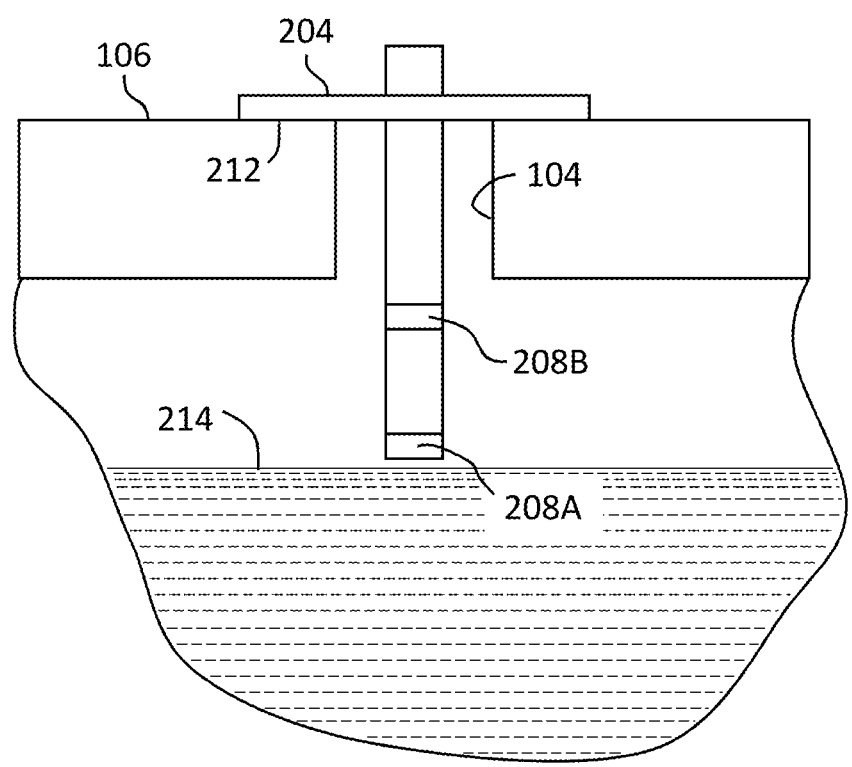
FIG. 6 is a side view partially in section of the device of FIG. 2 inserted into a vented lead acid battery where the electrolyte is below a threshold.

Referring to FIG. 5 and FIG. 6 a method of inspecting a battery, such as a vented lead acid battery for example, will be described. On a periodic or aperiodic basis, the maintenance operators may inspect the battery 100. The operator opens the cabinet (not shown) that the batteries 100 are located and removes the first cap 102 for the first cell. Removing the cap 102 exposes the opening 104. The operator then inserts the device 200 into the opening 104 until the surface 212 contacts the surface 106 of the battery 100. In this position, the elongated body 202 is sized to position the projections 208A, 208B, 208C, 208D within the interior of the battery such that the top surface 214 of the electrolyte is above the projections 208A, 208C and below the projections 208B, 208D when the electrolyte level is within the desired range as shown in FIG. 5. Therefore, when the device 200 is removed, the operator will see a small amount of electrolyte on the elongated body 202 or the projections 208A, 208C and can determine that the battery does not need any maintenance.

If the electrolyte has been depleted, as is shown in FIG. 6, the top surface 214 of the electrolyte will be located below the lower projections 208A, 208C. As a result, when the operator removes the device 100, no electrolyte will be on the elongated body 202 or the projections 208A, 208C. This indicates to the operator that additional water should be added to the cell to bring the top surface 214 into the desired range. It should be appreciated that the operator may have to repeat the process of inserting the device 200 into the cell after the water is added to check the electrolyte level until it is within range.

In some embodiments, when the operator inserts the device 200, the electrolyte level may be above the upper projections 208B, 208D. This indicates that the electrolyte level is above the desired range. It should be appreciated that this may indicate that the electrolyte has been diluted outside of a desired range and remediation steps may be taken.

The term "about" is intended to include the degree of error associated with measurement of the particular quantity based upon the equipment available at the time of filing the application.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An electrolyte level measuring device for a vented lead acid battery, the lead acid battery having a top surface and a plurality of cells having an opening in the top surface of the lead acid battery, each of the cells including an electrolyte fluid having a top surface, the device comprising:
    an elongated body sized to fit within each of the plurality of cells and extend through the opening and into the electrolyte fluid when the top surface of the electrolyte fluid is within a predetermined operating range within the cell, the elongated body having a first end and a second end;
    a stop member extending outwardly from, and perpendicular to, the elongated body, the stop member being sized larger than the opening of each of the plurality of cells, the stop member being positioned at the first end; and
    at least one projection extending orthogonally from the elongated body, the at least one projection includes a first projection and a second projection, the first projection being disposed at the second end, the second end being opposite the first end, the second projection being positioned between the first projection and the stop member, the first projection and second projection extending from the same side of the elongated body, wherein the distance between the first projection and the second projection to allow the top surface of an electrolyte fluid to be between the first projection and the second projection when the device is placed in the each cell of the plurality of cells and the fluid is within the predetermined operating.

2. The device of claim 1, wherein the at least one projection includes a third projection and a fourth projection disposed on opposite sides of the elongated body from the first projection and second projection, the fourth projection being positioned between the second end and the stop member.

3. The device of claim 1, wherein the stop member has a cylindrical shape.

4. The device of claim 3, wherein the elongated body has a rectangular cross-section in a plane parallel with a surface of the stop member.

5. The device of claim 1, wherein the at least one projection is disposed a predetermined distance from a bottom surface of the stop member.

* * * * *